No. 778,756. PATENTED DEC. 27, 1904.
W. C. MILLER.
PLUMB LEVEL.
APPLICATION FILED AUG. 19, 1904.

Witnesses
A. R. Walton.
M. A. Schmidt.

Inventor
William C. Miller,
by
Milo B. Stevens & Co.
Attorneys

No. 778,756.

Patented December 27, 1904.

UNITED STATES PATENT OFFICE.

WILLIAM C. MILLER, OF FREELAND, PENNSYLVANIA, ASSIGNOR OF ONE-HALF TO EVERTT W. RUTTER, OF FREELAND, PENNSYLVANIA.

PLUMB-LEVEL.

SPECIFICATION forming part of Letters Patent No. 778,756, dated December 27, 1904.

Application filed August 19, 1904. Serial No. 221,403.

*To all whom it may concern:*

Be it known that I, WILLIAM C. MILLER, a citizen of the United States, residing at Freeland, in the county of Luzerne and State of Pennsylvania, have invented new and useful Improvements in Plumb-Levels, of which the following is a specification.

My invention relates to plumb-levels, and has for its object to provide a simple and accurate instrument of this character.

A further object is to provide an instrument embodying compactness, strength, and durability in order to render the same capable of rough usage.

The invention also contemplates a novel arrangement of parts whereby readings can be taken from either the top or sides of the level.

Improved details in the construction and arrangement of the various parts of the invention will be apparent from the detailed description hereinafter when read in connection with the accompanying claims, reference being had to the drawings hereto annexed, in which—

Figure 1:
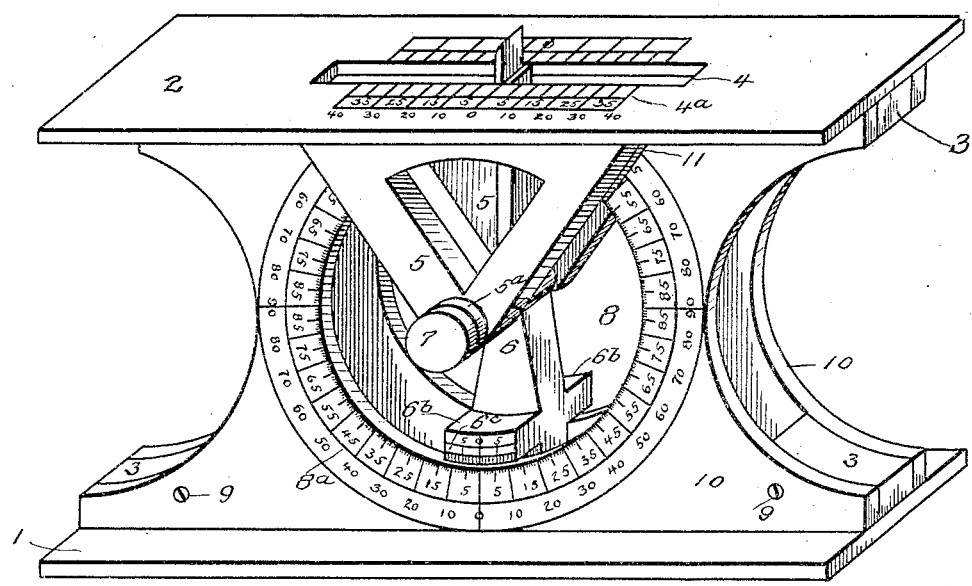
Figures 2, 3:
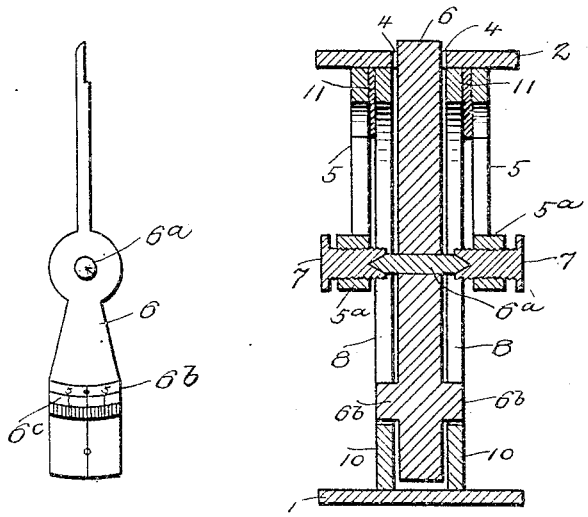

Figure 1 is a perspective view of the invention. Fig. 2 is a central vertical section. Fig. 3 is a face view of the pointer removed.

Referring specifically to the drawings, 1 denotes the bottom or base plate, and 2 the top plate. Both plates are provided with lugs 3, to which the side plates 10 are secured by screws 9 or other suitable fastening means. The plates 10 extend between the top and bottom plates and are spaced from each other by the lugs 3.

At 5 are indicated hangers for supporting the pointer 6. The latter swings on trunnions $6^a$, which fit in conical sockets formed in the ends of screws 7, which are screwed into the hangers 5. The said hangers extend on the outside of the plates 10, and the indicator swings between the plates. The lower ends of the hangers, through which the screws 7 pass, are enlarged, as at $5^a$, to afford a secure hold for the screws.

At 8 are indicated circular openings in the plates 10, which openings are concentric with the pivotal axis of the pointer. A protractor-scale $8^a$ extends around these openings, said scale being graduated in degrees from zero to ninety between and on each side of its perpendicular and horizontal diameters, the perpendicular diameter being marked "zero," and the horizontal terminating at "90." The pointer swings between two plates 10, and its lower end is made heavier, so that it will always maintain a perpendicular position. Near the lower end of the pointer, on each side thereof, are projections or flanges $6^b$, which extend outwardly so as to be substantially flush with the outer faces of the plates 10. The lower edges of the projections $6^b$ extend closely to the protractor-scale $8^a$, and the outer faces of said projections have a vernier-scale $6^c$. The said scales coöperate with the protractor-scales to render the readings more accurate. The top end of the pointer extends through a slot 4 in the top plate and indicates degrees of inclination on a scale $4^a$, formed on both sides of the slot. This scale, it will be noted, reads to forty degrees only, and when the inclination is greater than this readings must be taken from the scale $8^a$. The advantage of the top scale $4^a$ is to make the readings more convenient in leveling horizontal surfaces, as readings can be taken from the top of the level instead of compelling the operator to stoop or bend over to obtain the results from the sides of the instrument. The slot 4 is of sufficient length to permit the pointer to clear it when the inclination exceeds forty degrees.

The top and bottom plates are perfectly parallel and are also of the same length, so that the instrument can be placed on either end and applied to a perpendicular plane. The top scale $4^a$ also enables the instrument to be applied to a ceiling or overhead surfaces. In this position the instrument is inverted and the bottom of the pointer extends through the slot 4. The bottom portion of the pointer has an indicating-line on each side facing the scale $4^a$ when the pointer is in this position and coöperating therewith to indicate inclinations up to forty degrees. The pivotal axis of the pointer is so positioned as to permit said pointer to revolve completely on its axis and also to protrude sufficiently from the slot 4 to indicate on the scale 4ᵃ up to forty degrees. The hangers 5 are spaced from the side plates 10 by plates 11, so that the projections 6ᵇ will not interfere with the free swing of the pointer.

By the use of this instrument a spirit-level can be dispensed with, thus avoiding its liability to breakage, and means are provided for obtaining most accurate results, unattainable with ordinary spirit-levels, as in the latter the center of the bubble is to the average eye hard to determine. All the parts are perfectly true and accurately adjusted, and the slightest deviation from a horizontal or perpendicular plane can be easily detected and computed.

What I claim as new, and desire to secure by Letters Patent, is—

1. A plumb-level comprising a frame having scales on its sides and top; and a pointer pivoted in the frame and indicating on the top and the side scales, said pointer having projections provided with vernier-scales coöperating with the side scales to indicate inclinations thereon.

2. A plumb-level comprising base and top plates, the latter being slotted and provided with a scale along said slot; spaced side plates extending between the top and bottom plates, each of said side plates having a circular opening and a scale around the same; a pointer swinging between the side plates and indicating on the top scale, said pointer having projections provided with vernier-scales coöperating with the side scales to indicate inclinations thereon.

3. A plumb-level comprising base and top plates, the latter being slotted and provided with a scale along said slot; spaced side plates extending between the top and bottom plates, each of said side plates having a circular opening and a scale around the same; hangers depending from the top plates; screws extending through the hangers and having conical sockets in their ends; and a pointer between the side plates and having trunnions fitting in the sockets of the screws, said pointer indicating on the side scales and extending through the slot in the top plate to indicate on the scale thereon.

4. A plumb-level comprising base and top plates, the latter being slotted and provided with a scale along said slot; lugs on both plates; side plates extending between the top and bottom plates and fastened to the lugs and spaced thereby, each of said side plates having a circular opening and a scale around the same; and a pointer swinging between the side plates and indicating on the top and the side scales.

In testimony whereof I have signed my name to this specification in the presence of two subscribing witnesses.

WILLIAM C. MILLER.

Witnesses:
   JOHN M. CARR,
   E. W. RUTTER.